May 27, 1930.                J. F. QUINN                 1,759,955
                        COFFEE ROASTING MACHINE
                          Filed Jan. 16, 1929
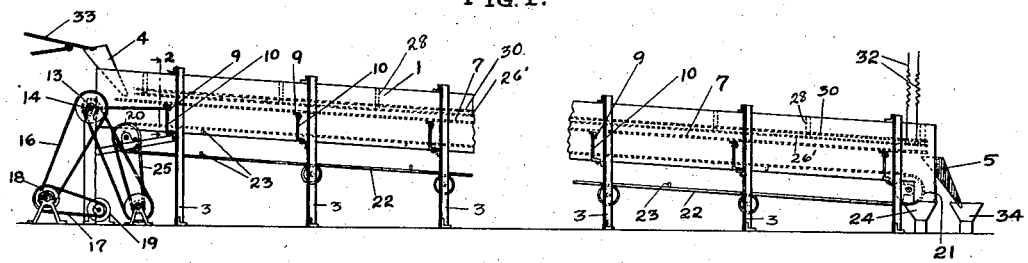
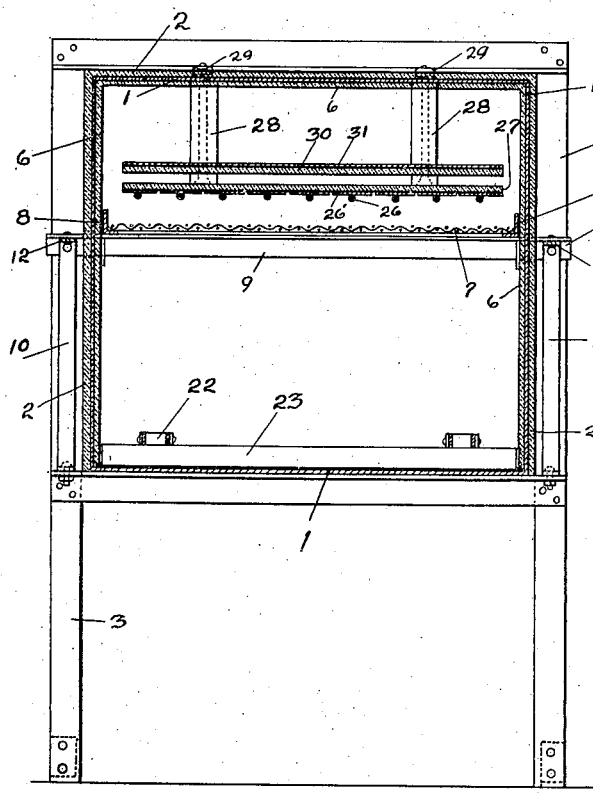
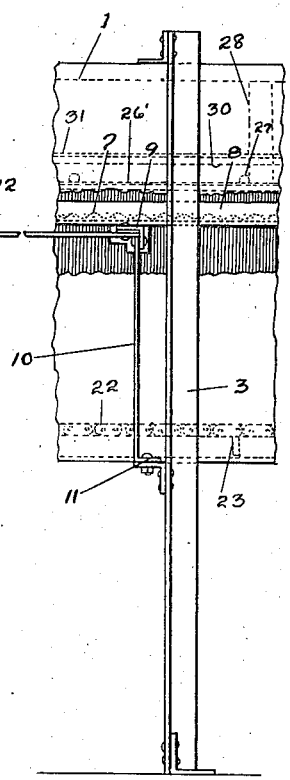
INVENTOR.
JOSEPH F. QUINN.
BY
ATTORNEYS.

Patented May 27, 1930

1,759,955

UNITED STATES PATENT OFFICE

JOSEPH F. QUINN, OF BURLINGAME, CALIFORNIA, ASSIGNOR TO GEO. W. CASWELL CO., OF SAN FRANCISCO, CALIFORNIA, A CORPORATION OF CALIFORNIA

COFFEE-ROASTING MACHINE

Application filed January 16, 1929. Serial No. 332,829.

This invention relates to the roasting of coffee and has for its objects improvements in apparatus for roasting coffee whereby an improved process of roasting may be carried out.

The process of this invention is covered in a divisional copending case containing the process claims, filed on April 12, 1930 under Serial No. 443,924.

Before taking up a description of the invention it would be well to state that coffee is generally roasted in revolving cylindrical drums, and usually there are two cylinders one within the other, with the coffee to be roasted placed in the space between the cylinders. The cylinders are perforated with fine holes and gas burners are positioned within the inner cylinder to produce the necessary roasting heat. These gas burners generate products of combustion which are vented through the perforations of the cylinders for discharge to an outer housing in which the cylinders revolve, and from the housing they pass to the stack. The products of combustion therefore come at all times in direct contact with the coffee beans, in fact pass through the mass of revolving coffee continually during the roasting process and therefore communicate objectionable matter to the coffee for absorption thereby, thus tending to contaminate the same and impart objectionable flavor to the resulting product.

Besides the above objection is the difficulty of maintaining an even heat due to the varying quality or pressures of the gas, and the humidity and temperature of the air of combustion supplying the flame. In fact the conditions vary so much that absolute timing of the roasting period under such conditions is very unusual in coffee roasting practice, but where best results are the aim, reliance is placed on the expert attendant roaster who judges by color only when the roasting is complete.

When the roasting is adjudged complete, the gas flame is extinguished and a quantity of cold water is injected into the mass of revolving coffee beans in the roaster, so as to quickly check the roasting process. This water turns at once into steam since the temperature of the roasted beans is about 350° Fahrenheit, and this brings in another variable adapted to influence flavor and uniformity of quality.

I have discovered that the uncertainties of roasting with gas and the objectionable contamination of the coffee resulting therefrom may be overcome by the apparatus and method of the invention to be disclosed.

Briefly described my invention comprises continuously passing a thin flat layer of coffee beans along a surface while tumbling them over and over, and maintaining a plane of radiant heat just above and close to the beans during their travel, so that all parts of each bean are exposed to the same degree of heat, and all for a time period so that upon discharge from the plane of radiant heat the roasting will be complete, and since the traveling layer of beans is substantially one layer thick, the roasting effect is instantaneously checked at the end of the treatment without the necessity of introducing water as in the gas process.

Also, the plane of radiant heat is preferably derived from an overlying network or multiplicity of electrical heating units associated with heat radiating and reflecting surfaces so that the heat will be directed downwardly, and since no heat is generated below the layer of beans there are no moist vapors passing through the beans to have any cooking tendency upon them as do the hot moist vapors of the gas flame used in the manner described, or the natural moist vapors generated in a body or mass of the beans being roasted in bulk.

The result of the process described gives a coffee of exceptionally high quality, every bean of which is individually roasted by being turned over and over for exposure to the downwardly directed rays of radiant heat, entirely free from contamination of any foreign agencies whatsoever, or the carrying away in a violent uprush of moist vapors of its valuable volatilized constituents, and a product which may be continuously produced of uniformly unvarying quality without expert attention.

In the drawings accompanying this application Fig. 1 is a side elevation of the apparatus broken through the housing so as to bring it within the limits of the drawing sheet.

Fig. 2 is an enlarged cross section of the apparatus as seen from the line 2—2 of Fig. 1.

Fig. 3 is a side view of Fig. 2 showing a representative portion of the apparatus with portion of the forward wall broken away.

In further detail the apparatus comprises a relatively long box or housing 1, generally from 10 to 25 or more feet in length, and which may be made of either wood or metal, and if of sheet metal it is preferably entirely insulated with heat insulating material such as asbestos or the like as indicated at 2.

This box or casing 1 may be horizontally disposed, but preferably it is given a slight downward inclination as shown in Fig. 1 and is conveniently supported on suitable frame members as indicated at 3.

Both ends of the box are closed except for a small opening at the upper end fitted with a delivery chute 4 and a similar opening at the lower end for the discharge of material from a small chute 5, and for the chaff adjacent chute 5.

The interior of the box, at least the upper portion and the two sides, are also preferably heat insulated with asbestos material as shown at 6, and about midway between the top and bottom of the box and extending for the full length thereof is a wire screen plate 7 arranged for operation as a shaker table for slowly moving a layer of coffee beans from the upper to the lower end of the box.

This shaker plate 7 is of a relatively rough weave so as to turn the beans over and over during the shaking of the device, and is of a mesh so as to pass the chaff released from the beans both by the shaking action and by the expansion due to the heating of the beans. The screen plate 7 is reinforced around its edges with a suitable frame and along the sides the frame is extended upwardly as indicated at 8 to prevent the layer of beans from working out over the edges during their travel along the screen. Secured to the frame 8 and passing transversely across the lower part of the screen at intervals along the box are supporting bars 9 which extend through apertures in the box of a size to permit the required shaking movement to the screen, and the free ends of these bars 9 outside of the box are supported on vertically extending spring metal strips 10 secured at their upper ends by riveting or welding, or otherwise to the bars 9 and at their lower ends to a portion of the framework as best indicated in Fig. 3 at 11. The spring metal strips 10 are arranged with their flat sides in a manner to permit vibration of the screen plate 7 longitudinally within the box 1. The screen is vibrated by means of pitmans 12 extending from one of the cross bars 9 to a revolving power shaft 13 extending horizontally across the delivery end of the box and supported in bearings 14 on the framework of the same.

Pitmans 12 preferably take the form of flexible strips of spring metal rigidly secured to one of the bars 9 at one end and at the other end each provided with a split bearing 15 which positions around a slight eccentric portion of the shaft 13 so as to give an oscillating movement of about an eighth of an inch when shaft 13 is revolved. Shaft 13 is revolved by means of suitable reduction belting as indicated at 16 and 17 passing over pulleys on a countershaft 18, and run from an electric motor 19 or any other prime mover desired. A speed of revolution of about 750 turns per minute on shaft 13 has been found satisfactory in practice with the throw of about one eighth of an inch of the eccentric portion of the shaft.

At opposite ends of the box 1 and adjacent the bottom thereof are pulleys or sprockets 20, 21 mounted on revolvable shafts as indicated and over which passes a belt or chain conveyor 22 carrying at intervals a scraper blade as shown at 23 so arranged that it will travel slowly along the bottom of the box inside of the same to carry along the chaff which falls from the coffee being roasted on the screen and eject same to a small opening in the bottom of the box into a discharge chute 24 at the extreme end of the apparatus. Conveyor 22 may receive its power by a reduction drive from shaft 13 as indicated at 25, or by any other reduction drive from the motor 19 in the well understood manner, the requirements being simply that the conveyor moves very slowly to occasionally carry out the accumulated chaff, as there is relatively very little of it as compared to the quantity of coffee passing over the screen plate 7.

Arranged above the screen plate 7 and substantially continuously extending over its entire area both in width and length of the box are a multiplicity of electrical heating elements 26 arranged in a flat layer. These elements extend longitudinally and are supported on transversely positioned, spaced insulating bars 27 in turn carried on insulating knobs 28 secured by concealed bolts 29 to the upper wall of the box.

Preferably also carried on the insulators 28 is a continuous sheet of asbestos material or other heat insulating and reflecting material 30 backed by a metal sheet 31, the arrangement being such that the heat insulating and reflecting material 30 will both radiate and reflect any heat being emitted from the upper side of the elements and force it downwards towards the screen plate 7. It is also contemplated that the heating elements 26 themselves be each supplied with a radiating and reflecting metal fin 26' such as the commercially obtainable electric air heating units made by the General Electric Company.

The electrical heating elements as described form a continuous web or plane of radiant heat disposed parallel with and directly over the screen plate 7, in practice separated therefrom about one to three inches, and during operation of the machine the elements are preferably maintained at a heat just below a dull red, or at a range lying between 400 and 500 degrees F., so as to effect a complete roasting of the beans in passing thereunder by a radiant heat alone yet without any tendency to produce surface burns thereon before the roasting is complete.

The electrical heating elements are connected up in any approved manner and are energized by power wires entering the box as indicated at 32 suitably controlled by a switch not shown.

In operation of the apparatus the raw coffee is fed in a continuous even stream from any suitable device such as a shaker feed table 33 to the receiving chute 4, while the screen plate 7 is continuously actuated by revolution of the eccentric shaft 13. The coffee striking the screen plate at once flattens out to a single layer in thickness and slowly travels downward toward the discharge end while constantly tumbling about and turning over and over due to the relation of the screen weave and the violence and speed of the vibration thereof. With an apparatus as described and with a speed of travel ranging from 7 to 10 minutes along a screen from 20 to 30 or more feet in length, a constant flow of perfectly roasted coffee will fall from chute 5 to a receiving hopper such as that indicated at 34 for passing the roasted beans to an aerator or cooling device preparatory to grinding the same.

Having thus described my invention it will be seen to suggest modifications without departing from the spirit of the invention, such for instance as heating the plates 30 or 26' by means of downwardly directed gas jets from above to make them radiate the heat as described yet without permitting contact of gas fumes with the coffee layer passing along the screen and any such modifications coming within the scope of the appended claims are intended to be covered therein.

I claim:

1. Coffee roasting apparatus comprising an elongated housing, a shaker table in said housing arranged to agitate and carry a layer of coffee beans through said housing, means for agitating the table, and means for maintaining a zone of radiant heat above and uniformly overlying the table.

2. Coffee roasting apparatus comprising an elongated housing supported in substantially horizontal extension, a shaker screen therein extending substantially the length thereof arranged to receive a continuous supply of beans at one end and to discharge same at the opposite end, means for shaking the screen to carry the beans through the housing, means for producing an area of downwardly directed heat rays over the screen substantially co-extensive therewith.

3. Coffee roasting apparatus comprising an elongated heat insulated housing supported in substantially horizontal extension, a shaker screen therein arranged to receive a continuous supply of coffee at one end for discharge at the other, means for operating the screen for conveying the beans therethrough and tumbling them about, a layer of electrical heating elements arranged above the screen and in proximity thereto, and heat radiating and reflecting means associated with said heating elements adapted to radiate and reflect the heat downwards against coffee carried by the screen.

4. In a structure as specified in claim 2, a plurality of bars extending transversely and freely through the housing and supporting said screen, and oscillable devices supporting said bars outside of the housing.

5. In a structure as specified in claim 3, said housing being inclined downwardly toward its discharge end and of a length to insure complete roasting of the beans in one passage therethrough.

JOSEPH F. QUINN.